UNITED STATES PATENT OFFICE.

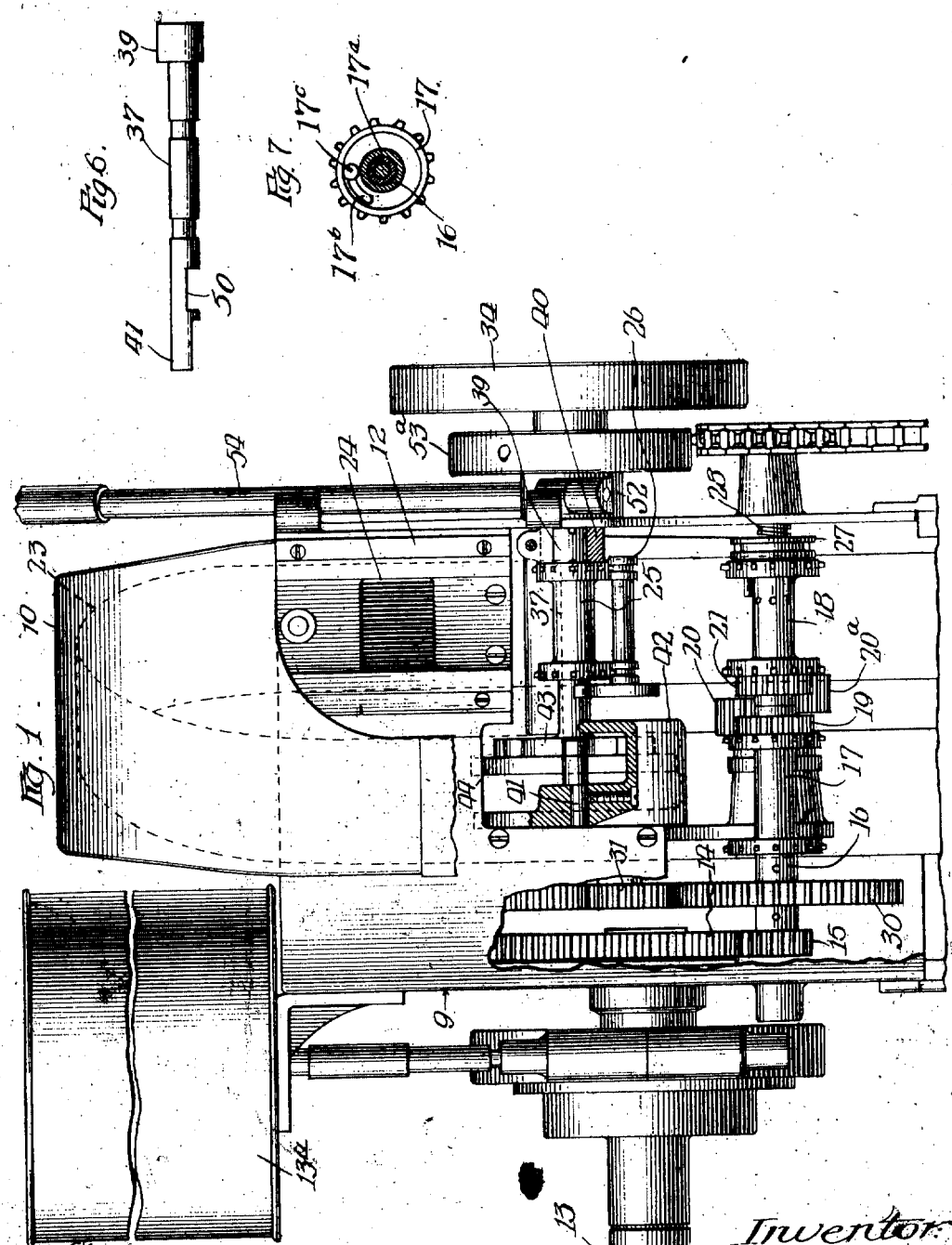

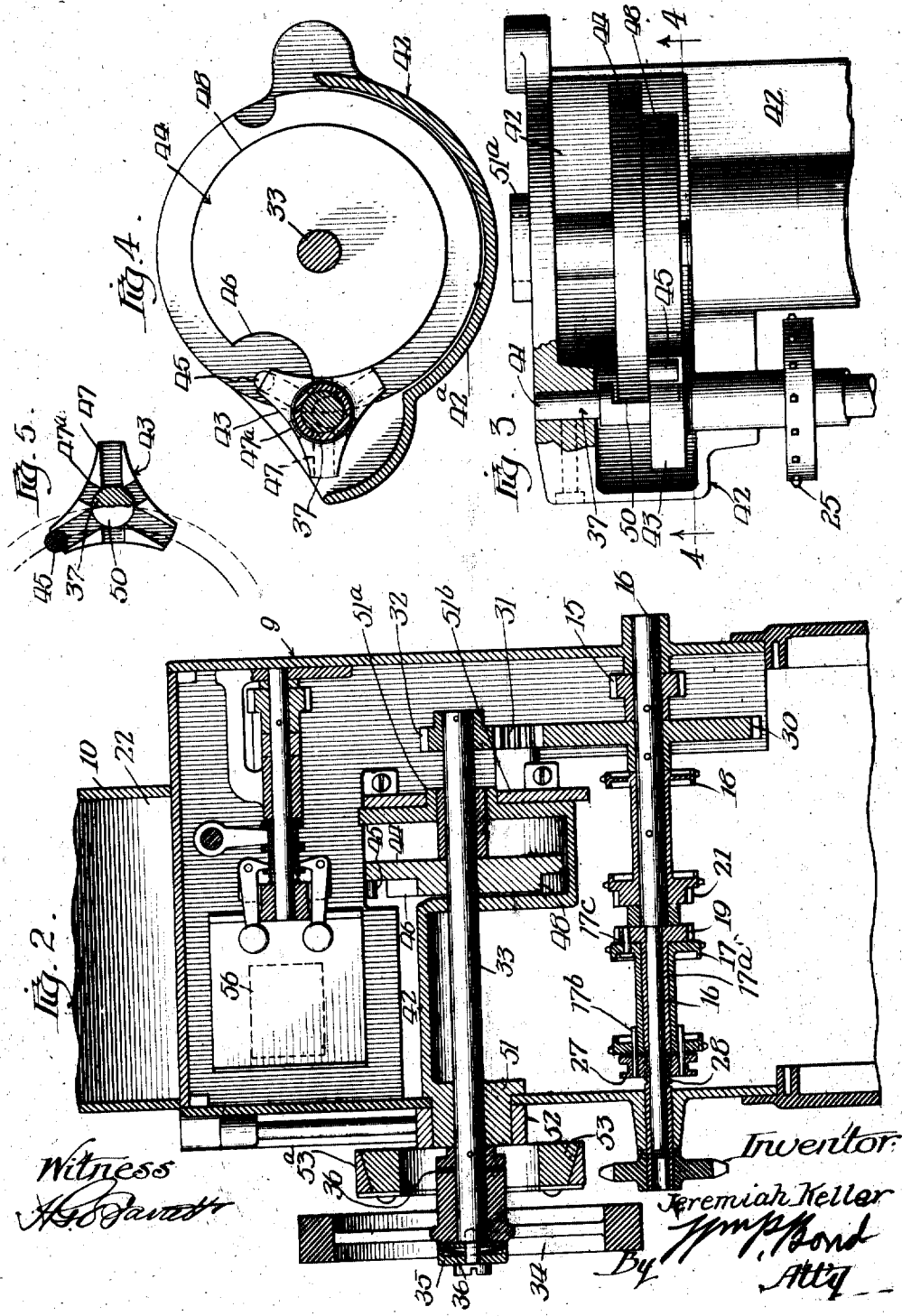

JEREMIAH KELLER, OF CHICAGO, ILLINOIS.

INTERMITTENT GEARING FOR MOTION-PICTURE MACHINES.

1,232,327.   Specification of Letters Patent.   Patented July 3, 1917.

Application filed June 19, 1916. Serial No. 104,419.

*To all whom it may concern:*

Be it known that I, JEREMIAH KELLER, a citizen of the United States, residing at Chicago, in the county of Cook and State of Illinois, have invented certain new and useful Improvements in Intermittent Gearing for Motion-Picture Machines, of which the following is a specification.

The present invention relates principally to mechanism for controlling the feed of film through the machine.

The objects of the invention are, to provide a mechanism for imparting to the film a relatively quick movement past the light aperture, and to allow the film to remain stationary in front of the light aperture for a relatively long period of time, thereby permitting the shutter to make a plurality of interruptions while the film is at rest; to provide a mounting for the star wheel of the film-feeding mechanism, whereby said wheel can be adjusted and maintained in proper peripheral engagement with the rotating disk and cam member with which it coöperates; and to provide means which act as a shock absorber to relieve the film from the effect of the blow when the pin of the disk member engages with the star wheel.
The invention further consists in the features of construction and combination of parts hereinafter described and claimed.

In the drawings:

Figure 1, a front view of the casing, partly broken away, to show portions of the interior mechanism;

Fig. 2, a vertical section through the casing;

Fig. 3, a detail plan view of the mechanism for imparting an intermittent movement to the main film feed sprocket, and showing a portion of the carrying member for said mechanism;

Fig. 4, a view of the star wheel and the rotating member for intermittently actuating the same taken on the line 4—4 of Fig. 3;

Fig. 5, a detail showing the path of travel of the pin which actuates the star wheel with respect to the shaft on which the star wheel is mounted;

Fig. 6, a detail of the shaft carrying the film-feeding sprocket and the star wheel; and Fig. 7, a detail of one end of the sprocket 18.

In the art to which the present invention relates, the type of motion picture machine known as the intermittent film-feed, operates upon the principle of drawing the film past the light aperture with a relatively quick movement, and allowing the picture to remain stationary in front of the light aperture for a relatively long period of time; and a shutter coöperates with the movement of this film so as to shut off the light during the movement of the film past the light aperture.

It has been determined best for the film to move sixteen times per second past the light aperture. It has also been proven that a clearer projection is obtained by increasing the number of times the shutter acts during a period of film movement to cut off the light; that is, increasing the number of light interruptions during each period of film movement. By a film movement is meant the time from the commencement of one movement of the film past the light aperture until the next movement past said aperture starts, thereby embracing one period of movement past the light aperture and one period of rest in front of said aperture.

One of the main features of the present invention is to so move the film as to obtain the desired sixteen movements per second, but to make the period of rest in such proportion to the period of movement as to allow the shutter to act four times during a period of film rest, thus obtaining sixty-four light interruptions per second.

Referring now to the drawings, the mechanism is inclosed within a casing 9 of suitable size and style. Pivotally attached to the casing is a cap-piece 10; also pivotally attached to the casing is a lens member 11, which carries any suitable form of film door or gate 12. A main driving shaft 13 is provided, which may be operated by a suitable hand crank or by a motor contained within a housing 13$^a$. Attached to the main driving shaft 13 is a gear 14, which meshes with a pinion 15 on a cross-shaft 16. This crossshaft carries a film take-up sprocket 17, loosely mounted on a sleeve 17$^a$ on said shaft, and a film-feeding sprocket 18, fixedly secured to the shaft 16, as will be seen from Fig. 2.

The sleeve 17$^a$ has connected thereto a pinion 19 meshing with a pinion 20, which in turn meshes with a pinion 20$^b$ meshing with a pinion 21 secured to the sprocket 18.

By this arrangement, the sprocket 17 is driven in reverse direction to the sprocket 18. The sprocket 18 is positively driven by the shaft 16 and acts to pull the film off from the reel and feed it upward toward a chamber 22 formed by the cap-piece 10. The film is bent back upon itself within the chamber to form a loop 23, (see Fig. 1), and then extends downward through the film gate past the light aperture 24 onto a main film-feeding sprocket 25. It then passes between guide rollers 26 down to the take-up sprocket 17, and from the sprocket 17 down to the take-up reel. Thus, the film is fed with a circular path of travel through the machine from the supply reel onto the take-up reel.

Joined to the sprocket 17, by pins 17$^b$, having a sliding fit in one end wall of said sprocket, is a threaded nut 27. The sprocket 17 is revolved through the gear connection from the sprocket 18, and the direct means of connection is a stud 17$^c$ joined to the pinion 19. This stud extends into a slot 17$^d$ in the opposite end face of the sprocket. This permits of a certain amount of lost motion between the sprocket 17 and the pinion 19, which allows the sprocket 17 to swing back and forth on the sleeve 17$^a$, in accordance whether tension is or is not placed on the sprocket 17 by the film passing to the take-up reel. This swinging movement of the sprocket 17 causes the nut 27 to travel back and forth on the threaded surface 28 of the shaft 16. This feature of moving the threaded nut has more to do with certain appliances for operating the fire doors for the light aperture, which appliances are embodied in my application Serial No. 104,418, filed June 19, 1916, and entitled Motion-Picture machines and will not be gone into in the present case.

Attached to the shaft 16 is a gear 30, which meshes with a pinion 31, in turn meshing with a pinion 32 attached to a shaft 33. This shaft, at its outer end, has frictionally secured thereto a fly-wheel 34. A cap-piece 35 is provided for holding this fly-wheel onto the shaft; and this cap-piece contains a spring 36, which, together with a washer 36$^a$, forms a frictional connection between the fly-wheel and the shaft.

In the present machine, owing to the speed with which the star wheel is turned, there is a sharp blow when the pin of the disk strikes the star wheel. Such blow is objectionable in that it might result in the film being torn by transmission of such blow to the main film-feeding sprocket. The shaft 33 carries the disk which operates the star wheel. By attaching the fly-wheel to the shaft with this frictional connection, when the pin of the disk strikes the star wheel, the blow will be cushioned by the slight slippage allowed between the fly-wheel and shaft, by reason of the frictional connection between these two parts. Thus, the shock produced when the pin strikes the star wheel is absorbed and is not transmitted to the main film-feeding sprocket.

The sprocket 25, which may be referred to as the main film-feed sprocket, is carried upon a sleeve 37$^a$ mounted on a stationary spindle 37, which is better shown in Fig. 8. This spindle terminates at one end in a notched head 39 having a bearing in a sleeve 40 formed on a shiftable film-feed sprocket carrier 42. At its other end the spindle terminates in a reduced portion 41, having a bearing in the wall of a cup-shaped portion 42$^a$ of the carrier 42. In addition to the sprocket 25, this sleeve 37$^a$ also has secured thereto a three-point star wheel 43.

It will be noted that the ends of the spindle 37 are eccentric with respect to the remainder thereof. By turning the spindle through an instrument which is adapted to be inserted within the notch of the head 39, the spindle will be thrown bodily in a backward or forward direction about the eccentric center thereof. This moves the sleeve 37$^a$, carrying the star wheel, in and out, so as to maintain the faces of the star wheel in proper relation to the periphery of a cam 48 on the disk 44. The disk 44 is mounted on the shaft 33 and is continuously driven thereby.

The disk 44 carries a pin 45 and is provided with a notch 46 opposite said pin. As the disk revolves, the pin enters into one of the three grooves 47 in the star wheel 43, and, owing to the fact that the pin is positioned at the point where the notch 46 is made, turns the star wheel a one-third revolution. After this turning movement, the curved peripheries 47 of the star wheel ride along the periphery of the face of the cam 48 of the disk 44, thus locking the star wheel against further movement after the turning operation.

By referring to Fig. 4, it will be seen that the star wheel, being of a three-point character, will have curved surfaces, each of which comprise, as shown, one-sixth of the periphery of the face of the cam 48. The star wheel will be turned by the pin 45 during about one-tenth of a revolution of the disk, and will remain at rest during the remaining nine-tenths of such revolution. The star wheel operates the main film-feeding sprocket, and thus the film travels past the light aperture for one-tenth of a period of movement, and remains at rest the other nine-tenths of such period. This feature is of special importance with relation to the shutter operation. The shutter will act to cut off the light during the travel of the film past the light aperture, and will continue to act while the film is at rest. It will therefore produce four interruptions of light during a film movement, one while the film is traveling past the light aperture, and three while the film is standing still. This, as explained, increases the sharpness of the picture and makes a better projection.

This shutter operation is allowed, because of the use of a three-point star wheel, which gives a quick movement past the light aperture, permitting the use of a small shutter blade, and the consequent production of a high number of interruptions during a period of film movement. As stated, each period of darkness produced by the shutter is one-tenth of a film movement, and as there are four periods of darkness to each film movement, it follows that during each film movement the light will be cut off four-tenths of the time and will be on six-tenths of the time, thus giving ample light for projecting purposes.

The pin 45 will travel in such relation to the center of movement of the star wheel as to cause it to intersect the path or plane occupied by that portion of the shaft 37 on which the star wheel is mounted. Therefore, it is necessary to arrange the mounting for the star wheel so that this pin can clear it; and, in the construction illustrated, I form a notch 50 in the shaft 37, permitting the pin to clear, as will be understood from Figs. 5 and 7.

During the operation of these motion picture machines, the film will come out of accurate registration with the light aperture, so that a portion of two pictures will be simultaneously projected upon the screen. It it necessary, therefore, to move the film otherwise than by the regular feed movement, so as to bodily shift the film to again bring it into proper registration with the light aperture.

In the present construction, the shaft 37, film-feed sprocket 25, disk 44, and the star wheel 43, are carried by the movable carrier. This carrier is formed with a hub 51 on one end (see Fig. 2), mounted in the walls of the casing, and at its other end is provided with a sleeve 51ᵃ journaled in a plate 51ᵇ. Connected to the hub is a collar 52 attached to a disk 53, mounted to revolve within a stationary friction band 53ᵃ. The collar is of an elongated construction, as will be seen from Fig. 1, and one end or wing thereof receives a rod 54. By moving this rod, the collar is rocked, which also rocks the hub 51. The rocking of the hub 51 rocks the carrier 42 about the center of its mounting, and the center of movement of the carrier is in reality the center of the shaft 33. When this carrier rocks, it necessarily carries the shaft 37 in a swinging motion, since this shaft is lying to the front of the carrier, resulting in a swinging movement being imparted to the main feeding sprocket 25, which gives a bodily movement to the film to bring it into proper register with the light aperture; in other words, to perform what is known as a framing of the film.

I claim:

1. In a motion picture machine, the combination of a film-feeding sprocket, a star wheel for rotating said sprocket intermittently, a disk and pin mechanism for operating the star wheel, a spindle on which the star wheel is loosely mounted, the path of travel of said pin intersecting the plane in which the spindle is lying, and said spindle being configured at said point of intersection to permit the pin to clear the same, substantially as described.

2. In a motion picture machine, the combination of a film-feeding sprocket, a star wheel, a disk and pin mechanism for operating the star wheel, a mounting for the star wheel, said pin intersecting in its movements the plane in which the mounting for the star wheel is located, and said mounting being arranged to permit a passage of the pin by the mounting, substantially as described.

3. In a motion picture machine, the combination of a film-feeding sprocket, a star wheel, a disk and pin mechanism for operating the star wheel, a spindle on which the star wheel is loosely mounted, said spindle being located within the path of movement of the pin, and said spindle being cut away to permit passage of the pin by the spindle, substantially as described.

4. In a motion picture machine, the combination of a film-feeding sprocket, a star wheel for actuating said sprocket, a disk and pin mechanism for intermittently actuating the star wheel, and means for moving the axial center of the star wheel with respect to the pin and disk mechanism to maintain it in proper position with respect to said mechanism, substantially as described.

5. In a motion picture machine, the combination of a film-feeding sprocket, a star wheel for actuating said sprocket, a disk and pin mechanism for intermittently actuating the star wheel, an eccentric spindle upon which the star wheel is loosely mounted, said spindle when turned moving the axial center of the star wheel into proper relation with respect to the disk and pin mechanism, substantially as described.

6. In a motion picture machine, the combination of a film-feeding sprocket, a star wheel for actuating said sprocket, a disk and pin mechanism for actuating the star wheel, a spindle upon which the star wheel and sprocket are loosely mounted, a bearing for each end of the spindle, both ends of the spindle being eccentric with respect to the body of the spindle, and one end of the spindle terminating in a head configured to receive a tool, and said spindle when turned shifting the axial center of the star wheel, substantially as described.

7. In a motion picture machine, the combination of a film-feeding sprocket, a star wheel for actuating said sprocket, a continuously rotatable member for actuating the star wheel, a shaft on which said member is maintained, and means for cushioning said rotatable member when it actuates the star wheel, substantially as described.

8. In a motion picture machine, the combination of a film-feeding sprocket, a star wheel for actuating the sprocket, a continuously rotating member for actuating the star wheel, a shaft on which the continuously rotating member is maintained, a fly-wheel on the shaft, and means permitting slippage of the fly-wheel with respect to the shaft to cushion the rotating member when it actuates the star wheel, substantially as described.

9. In a motion picture machine, the combination of a film-feeding sprocket, means for intermittently actuating said sprocket, a shaft forming a portion of said actuating means, and means for cushioning said shaft when the said means actuate said sprocket, substantially as described.

10. In a motion picture machine, the combination of a film-feeding sprocket, a three-point star wheel connected to said sprocket, a disk member, a pin carried by the disk member, adapted to engage and move the star wheel, and means for absorbing the blow produced by the engagement of the pin and star wheel, substantially as described.

11. In a motion picture machine, the combination of a film-feeding sprocket, a star wheel connected to said sprocket, means for engaging and intermittently turning said star wheel a partial revolution, and means for absorbing the blow produced when said star wheel engaging and turning means contacts with the star wheel, substantially as described.

JEREMIAH KELLER.